(12) United States Patent
Erickson et al.

(10) Patent No.: US 10,678,266 B2
(45) Date of Patent: *Jun. 9, 2020

(54) METHOD AND SYSTEM FOR CONTINUED NAVIGATION OF UNMANNED AERIAL VEHICLES BEYOND RESTRICTED AIRSPACE BOUNDARIES

(71) Applicant: INTERNATIONAL BUSINESS MACHINES CORPORATION, Armonk, NY (US)

(72) Inventors: Thomas D. Erickson, Minneapolis, MN (US); Clifford A. Pickover, Yorktown Heights, NY (US); Maja Vukovic, New York, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/046,144

(22) Filed: Jul. 26, 2018

(65) Prior Publication Data

US 2018/0356839 A1 Dec. 13, 2018

Related U.S. Application Data

(63) Continuation of application No. 15/234,189, filed on Aug. 11, 2016, now Pat. No. 10,082,802.

(51) Int. Cl.
*G01C 23/00* (2006.01)
*G01C 21/20* (2006.01)
(Continued)

(52) U.S. Cl.
CPC .............. *G05D 1/101* (2013.01); *G01C 21/20* (2013.01); *G01C 21/34* (2013.01); *G01C 23/005* (2013.01); *B64C 2201/146* (2013.01)

(58) Field of Classification Search
CPC ...... G05D 1/101; G01C 21/20; G01C 23/005; G01C 21/34; B64C 2201/146
(Continued)

(56) References Cited

U.S. PATENT DOCUMENTS 8,644,512 B2    2/2014  Khazan et al.
8,938,431 B2    1/2015  Densham et al.
(Continued)

FOREIGN PATENT DOCUMENTS

CN    102339021    2/2012
EP      2138921    12/2009

OTHER PUBLICATIONS

Huiyao Wu et al., Vison-based Auxiliary Navigation Method using Augmented Reality for Unmanned Aerial Vehicles, IEEE 10th International Conference on Industrial Informatics, Beijing, Jul. 2012, pp. 520-525.
(Continued)

*Primary Examiner* — Brian P Sweeney
(74) *Attorney, Agent, or Firm* — Tutunjian & Bitetto, P.C.; Anthony Curro

(57) ABSTRACT

A system for continued navigation of unmanned aerial vehicles beyond restricted boundaries. The system comprises a monitoring device to track a geolocation corresponding to an unmanned aerial vehicle and to compare the geolocation corresponding to the unmanned aerial vehicle with a geolocation corresponding to a restricted boundary to determine a location of the unmanned aerial vehicle with respect to a restricted environment, and a route generator to generate an alternative navigation method to navigate the restricted environment when the unmanned aerial vehicle is located within a predetermined distance of the restricted environment.

18 Claims, 6 Drawing Sheets

(51) Int. Cl.
*G05D 1/10* (2006.01)
*G01C 21/34* (2006.01)

(58) Field of Classification Search
USPC .............................................. 701/2
See application file for complete search history.

(56) References Cited

U.S. PATENT DOCUMENTS

| | | |
|---|---|---|
| 9,064,128 B1 | 6/2015 | Pelenur et al. |
| 2004/0249519 A1 | 12/2004 | Frink |
| 2010/0084513 A1 | 4/2010 | Gariepy et al. |
| 2010/0250022 A1 | 9/2010 | Hines et al. |
| 2012/0069928 A1 | 3/2012 | Jose et al. |
| 2014/0018979 A1 | 1/2014 | Goossen et al. |
| 2014/0267723 A1 | 9/2014 | Davidson, Jr. et al. |
| 2015/0064658 A1 | 3/2015 | Hales et al. |
| 2015/0254988 A1* | 9/2015 | Wang .................. G05D 1/0214 701/3 |
| 2015/0339931 A1* | 11/2015 | Yu ........................ G05D 1/0214 701/122 |
| 2016/0091894 A1 | 3/2016 | Zhang et al. |
| 2016/0253907 A1* | 9/2016 | Taveira .................. G08G 5/006 701/3 |
| 2016/0321930 A9* | 11/2016 | Yu ........................ G05D 1/0214 |

OTHER PUBLICATIONS

List of IBM Patents or Patent Applications Treated as Related dated Jul. 26, 2018, 2 pages.

\* cited by examiner

METHOD AND SYSTEM FOR CONTINUED NAVIGATION OF UNMANNED AERIAL VEHICLES BEYOND RESTRICTED AIRSPACE BOUNDARIES

BACKGROUND

Technical Field

The present invention relates generally to an unmanned aerial vehicle and, in particular, to a method and system for continued navigation of unmanned aerial vehicles beyond restricted airspace boundaries.

Description of the Related Art

An unmanned aerial vehicle (UAV), which is also commonly known as a drone, can be employed for various functions, including reconnaissance, combat, delivering cargo, data collection and/or exploration. Because unmanned aerial vehicles typically travel via flight, unmanned aerial vehicles provide a unique way to explore different areas especially over areas having difficult terrain. However, some areas are protected by restricted airspace regulations (e.g., "no fly" zones) where navigation of unmanned aerial vehicles is strictly prohibited, such as military bases, airports, hospitals, wildlife sanctuaries, private property, etc. Accordingly, because users are not allowed to use unmanned aerial vehicles in these restricted zones, users are unable to explore such areas and have no alternative mechanism to do so.

SUMMARY

According to an aspect of the present principles, a system for continued navigation of unmanned aerial vehicles beyond restricted boundaries is provided. The system may include a monitoring device to track at least one geolocation corresponding to an unmanned aerial vehicle and to compare the at least one geolocation corresponding to the unmanned aerial vehicle with at least one geolocation corresponding to a restricted boundary to determine a location of the unmanned aerial vehicle with respect to a restricted environment, and a route generator to generate at least one alternative navigation method to navigate the restricted environment when the unmanned aerial vehicle is located within a predetermined distance of the restricted environment.

According to another aspect of the present principles, a method for continued navigation of unmanned aerial vehicles beyond restricted boundaries is provided. The method may include tracking, using a processor-based monitoring device, at least one geolocation corresponding to an unmanned aerial vehicle, comparing the at least one geolocation corresponding to the unmanned aerial vehicle with at least one geolocation corresponding to a restricted boundary to determine a location of the unmanned aerial vehicle with respect to a restricted environment, and generating at least one alternative navigation method to navigate the restricted environment when the unmanned aerial vehicle is located within a predetermined distance of the restricted environment.

According to another aspect of the present principles, a non-transitory computer readable storage medium for continued navigation of unmanned aerial vehicles beyond restricted boundaries is provided. The non-transitory computer readable storage medium may include a computer readable program for continued navigation of unmanned aerial vehicles beyond restricted boundaries, wherein the computer readable program, when executed on a computer, causes the computer to execute tracking, using a processor-based monitoring device, at least one geolocation corresponding to an unmanned aerial vehicle, comparing the at least one geolocation corresponding to the unmanned aerial vehicle with at least one geolocation corresponding to a restricted boundary to determine a location of the unmanned aerial vehicle with respect to a restricted environment, and generating at least one alternative navigation method to navigate the restricted environment when the unmanned aerial vehicle is located within a predetermined distance of the restricted environment.

Another system for navigation of unmanned aerial vehicles around restricted boundaries includes a monitoring device to track a geolocation corresponding to an unmanned aerial vehicle relative to a restricted boundary of a restricted environment, and a route generator to generate at least one alternative navigation method to navigate when the unmanned aerial vehicle is located within or a predetermined distance from the restricted environment.

Another method for navigation of unmanned aerial vehicles around restricted boundaries includes comparing a geolocation corresponding to an unmanned aerial vehicle with at least one geolocation corresponding to a restricted boundary to determine a location of the unmanned aerial vehicle with respect to a restricted environment; and generating at least one alternative navigation method to navigate when the unmanned aerial vehicle is located within or a predetermined distance from the restricted environment.

These and other features and advantages will become apparent from the following detailed description of illustrative embodiments thereof, which is to be read in connection with the accompanying drawings.

BRIEF DESCRIPTION OF THE SEVERAL VIEWS OF THE DRAWINGS

The disclosure will provide details in the following description of preferred embodiments with reference to the following figures wherein.

DETAILED DESCRIPTION

Figure 1:
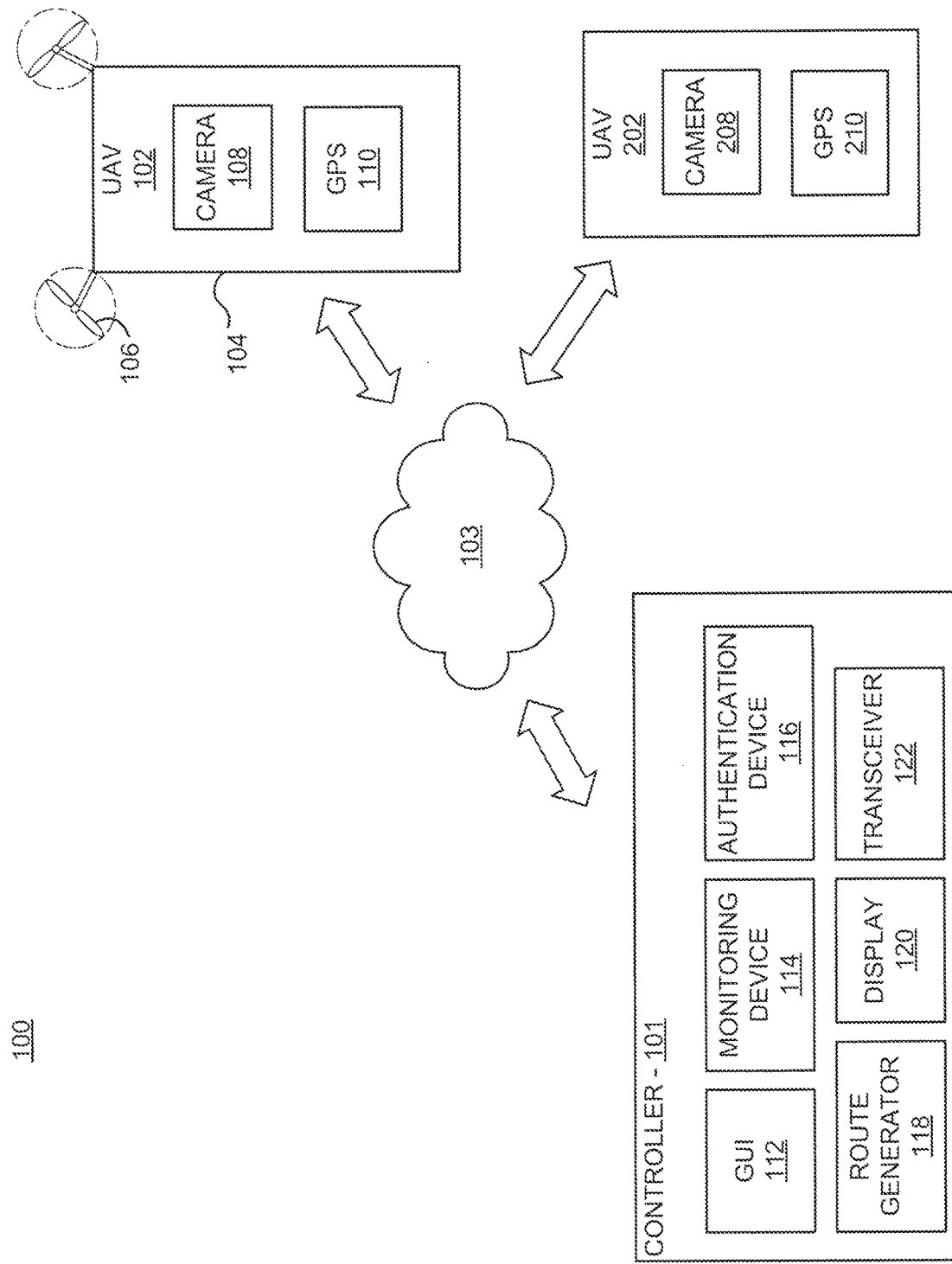
FIG. 1 is a block/flow diagram illustrating an exemplary system/method for continued navigation of unmanned aerial vehicles beyond restricted airspace boundaries, in accordance with an embodiment of the present principles.

The present principles are directed to continued navigation of unmanned aerial vehicles beyond restricted airspace boundaries. In some embodiments, the present principles provide systems, methods and computer program products to monitor/track a geolocation of an unmanned aerial vehicle with respect to a restricted airspace boundary, including determining when the unmanned aerial vehicle comes within a predetermined distance of the restricted airspace boundary. In some embodiments, the system, method and computer program product described herein may automatically prevent the unmanned aerial vehicle from physically traversing the restricted airspace boundary and may provide a virtual representation of an area beyond the restricted airspace boundary. In an embodiment, the system, method and computer program product described herein may automatically prevent the unmanned aerial vehicle from physically traversing the restricted airspace boundary and may provide a user with a secondary drone for physically exploring beyond the restricted airspace boundary. In some embodiments, the system, method and computer program product described herein may authenticate the unmanned aerial vehicle for physically traversing the restricted airspace boundary. Accordingly, a user may continue to visually navigate in areas beyond restricted airspace boundaries.

The present invention may be a system, a method and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Referring to the drawings in which like numerals represent the same or similar elements and initially to FIG. 1, an exemplary system 100 for navigating an unmanned aerial vehicle 102 beyond a restricted airspace boundary is illustratively depicted. It should be understood by one of ordinary skill in the art that the unmanned aerial vehicle 102 may comprise a drone, a drone-like unit, or a similarly functioning device.

The unmanned aerial vehicle 102 may include at least one movement mechanism 106 attached to a housing unit 104. In some embodiments, the at least one movement mechanism 106 may include a single propeller, a plurality of propellers, a propulsion mechanism, or similarly functioning devices to move and/or redirect the unmanned aerial vehicle 102 over various geolocations.

The movement mechanism 106 provides aerial movement for the unmanned aerial vehicle 102 in multiple degrees of freedom. Multiple degrees of freedom generally refers to the ability for the unmanned aerial vehicle 102 to move in a three-dimensional space. Specifically, the movement mechanism 106 may be controlled by a steering controller (not shown) to move the unmanned aerial vehicle 102 along three perpendicular axes, namely forward/backward movement, up/down movement, and left/right movement. In addition, the movement mechanisms 106 and/or steering controller may control the movement of the unmanned aerial vehicle in 360 degree rotation, tilting forward/backward movement (e.g., pitching), swiveling left/right movement (e.g., yawing), and pivoting side to side movement (e.g., rolling).

In an embodiment, a monitoring device 114 and/or route generator 118 may suspend and/or terminate movement (e.g., forward/backward and/or left/right) of the movement mechanisms 106 into a restricted area (e.g., beyond a restricted airspace boundary) when the unmanned aerial vehicle 102 comes within a predetermined distance of a restricted airspace boundary, as will be described in further detail below. When the unmanned aerial vehicle 102 comes within the predetermined distance, the movement mechanisms 106 may continuously provide hovering abilities to maintain its position and/or allow the unmanned aerial vehicle 102 to land on ground and/or a recharging station.

In some embodiments, the unmanned aerial vehicle 102 may include at least one camera 108. The camera 108 may provide visual feedback to the unmanned aerial vehicle 102, such as one or more still images and/or video feedback. For example, the camera 108 may capture images of a surrounding location which may be transmitted to a controller 101 via communication network 103, as will be described in further detail below. Accordingly, the camera 108 may provide the user with visual feedback to navigate and/or explore different geolocations.

The camera 108 may be positioned on the unmanned aerial vehicle 102 such that the camera may provide visual feedback in 360 degrees on a horizontal plane and/or 360 degrees on a vertical plane of the unmanned aerial vehicle 102. In some embodiments, the camera 108 may include a plurality of cameras to provide visual feedback in all directions surrounding the unmanned aerial vehicle 102 such that there are no obscurations of the visual field (e.g., blind spots). In further embodiments, the camera 108 may be embedded within the housing unit 104 so as to prevent any negative effects to the aerodynamics of the unmanned aerial vehicle 102.

In a further embodiment, the camera 108 may be configured to provide visual feedback of obstacles in the path of the unmanned aerial vehicle 102 for any purpose, such as, but not limited to, navigation guidance to the unmanned aerial vehicle 102. It should be understood that various types of cameras are contemplated, including high definition cameras, night-vision enabled cameras, infrared sensing cameras, X-ray imaging devices, line scan imaging devices, etc.

In an embodiment, the unmanned aerial vehicle 102 may include a navigation unit, such as a global positioning system (GPS) 110. The GPS 110 may determine and/or provide location information (e.g., a geolocation) and/or time information with respect to a physical location of the unmanned aerial vehicle 102. For example, the GPS 110 may provide geolocation coordinates corresponding to where the unmanned aerial vehicle 102 is physically located in real-time.

The unmanned aerial vehicle 102 may also include other components (not shown) or may omit some components as shown. The components of the unmanned aerial vehicle 102 may be affixed on the outside of the housing unit 104, or alternatively, may be enclosed within the housing unit 104 of the unmanned aerial vehicle 102.

In an embodiment, the unmanned aerial vehicle 102 and/or movement mechanisms 106 may be controlled by a controller 101. For example, the controller 101 may include a remote control wirelessly connected to the unmanned aerial vehicle 102 via communication network 103. A user may interact with and/or perform one or more functions of the unmanned aerial vehicle 102 via a graphical user interface (GUI) 112, such as a touchscreen. It should be understood that the controller 101 may include, but is not limited to, a mobile device (e.g., cellular telephone), tablet, remote control, and/or a central processing unit (CPU).

The controller 101 may include a monitoring device 114. The monitoring device 114 may track a geolocation of the unmanned aerial vehicle 102, such as tracking the physical location of the unmanned aerial vehicle 102 in real-time. In some embodiments, the monitoring device 114 may track the geolocation of the unmanned aerial vehicle 102 using navigation coordinates provided by the GPS 110. In an embodiment, the monitoring device 114 may track a geolocation of the unmanned aerial vehicle 102 using real-time location systems, vehicle tracking systems and/or image comparison techniques, etc. For example, the monitoring device 114 may determine a geolocation of the unmanned aerial vehicle 102 by comparing an image captured by camera 108 and comparing the captured image to stored images on a database (not shown) to determine where the unmanned aerial vehicle 102 is physically located.

In some embodiments, the monitoring device 114 may detect restricted airspace boundaries (e.g., restricted boundaries) designating restricted geolocations and/or restricted areas. Restricted boundaries may include navigation coordinates of geolocations in which navigation of unmanned aerial vehicles is strictly prohibited. For example, restricted areas (e.g., "no fly" zones) may include military bases, airports, hospitals, wildlife sanctuaries, private property, etc., where all or some navigation using unmanned aerial vehicles 102 is prohibited and/or limited. Each restricted area may include a plurality of restricted boundaries, such as length and width boundaries determined by property size, and/or length, width and height boundaries (e.g., altitude above the ground of a property).

In an embodiment, the monitoring device 114 may detect restricted boundaries by GPS coordinates provided by GPS 110, radio beacons, location estimation, maps and/or visual detection (e.g., image comparison) using camera 108. For example, a landowner and/or property owner may provide a two-dimensional (2D) and/or three-dimensional (3D) image of a virtual boundary representing a zone of exclusion (e.g., restricted area), which may be designated on one or more maps stored in a database (not shown) accessible by the monitoring device 114. In other embodiments, a landowner/property owner may provide latitude and longitude coordinates which may be plotted on a map stored in the database. It should be noted that the monitoring device 114 may include a database.

Radio beacons, for example, may include a device located on or near the physically property of a restricted area. In some embodiments, the radio beacons may broadcast a radio signals, infrared signals, and/or sonar signals indicating the location of a restricted area, which may be detected by monitoring device 114. In some embodiments, the restricted zone may be established by circular boundaries and/or hemispherical boundaries around a wireless beacon. The monitoring device 114 may track geolocations of the restricted boundaries and unmanned aerial vehicle 102 and may compare the geolocation of the unmanned aerial vehicle 102 with the geolocation of the restricted boundary to determine when the unmanned aerial vehicle 102 physically comes within a predetermined distance of the restricted boundary.

In an embodiment, the controller 101 may include an authentication device 116 to authenticate the unmanned aerial vehicle 102. For example, the authentication device 116 may initiate one or more authentication protocols to authenticate (e.g., approve) the unmanned aerial vehicle 102 to traverse the restricted boundary and/or restricted area. Authentication protocols may be established by the landowner/property owner and may be stored in a database (not shown) and/or the authentication device 116. In some embodiments, landowners may allow certain unmanned aerial vehicles 102 to traverse the restricted area. For example, unmanned aerial vehicles 102 without cameras 108 may be permitted to traverse the restricted area and/or may be allowed only in certain areas of the restricted area. In some embodiments, the authentication device 116 may permit access to the restricted area, or portions thereof, if one or more components of the unmanned aerial vehicle 102 (e.g., camera 108) is disabled. Accordingly, the authentication device 116 may permit the unmanned aerial vehicle 102 to physically traverse the restricted property, or portions thereof, upon authentication.

In some embodiments, authentication protocols initiated by the authentication device 116 may include security token verification, password verification, drone identification (e.g., a pointer to the registered owner of the drone or information regarding components of the unmanned aerial vehicle 102 that are present, absent, enabled, or disabled), context (e.g., flight plans and/or purposes specified by a drone user, time of day, weather, nighttime or day time, etc.), payment confirmation, analysis of the drone (e.g., size, type, speed, sound, direction of aerial flight, receiver frequency, etc. associated with the unmanned aerial vehicle 102), and/or a combination thereof.

For example, the authentication device 116 may approve the unmanned aerial vehicle 102 to traverse the restricted area upon payment of a fee, which may be collected by the property owner via wireless transmission over network 103. In some embodiments, the authentication device 116 may indicate components of the unmanned aerial vehicle 102 to be disabled before authentication may be approved. In a further embodiment, the authentication device 116 may disable functions of the unmanned aerial vehicle 102 upon approval, such as deactivating the camera 108 and/or deactivating the ability for the unmanned aerial vehicle 102 to physically traverse certain areas within the restricted area, which may be established via navigation coordinates.

In some embodiments, the controller 101 may include a route generator 118. The route generator 118 may be configured to generate one or more alternative navigation methods for navigating beyond restricted boundaries when the unmanned aerial vehicle 102 physically comes within the predetermined distance from the restricted boundary. Accordingly, the route generator 118 may provide alternative methods for the user to navigate and/or explore the restricted area, as permitted.

In an embodiment, the route generator 118 may generate one or more visual representations of a geolocation beyond the restricted boundary, such as a virtual representation (e.g., a virtual map). For example, the controller 101 may include a display 120 to visually display the one or more visual representations. The display 120 may display one or more still images and/or video feedback captured by the camera 108. In an embodiment, the virtual representation provides continued virtual navigation of at least a portion of the restricted environment in a virtual environment to the user via the display 120. Accordingly, the user may be able to visually "see" where the unmanned aerial vehicle 102 is physically navigating in real-time, even if the unmanned aerial vehicle 102 is outside the user's visual field.

In some embodiments, the one or more representations may include a virtual representation of a geolocation beyond a restricted boundary. As described above, some geolocations may be protected by airspace restrictions prohibiting the unmanned aerial vehicle 102 from aerially traversing the geolocation. The virtual representation may include, for example, satellite imagery, street maps, graphical representations of areas, real-time imagery that is limited, outdated imagery (e.g., stored imagery), etc. For example, the virtual representation may be provided by the landowner of the restricted area thereby permitting only certain representations of the restricted area as approved by the landowner. In some embodiments, the virtual representation may include virtual objects that correlate with some or all objects and/or attributes within the physical restricted area geolocation. For example, the virtual representation may accurately reflect geolocations of buildings that are physically present within the geolocation of the restricted area. Accordingly, the display 120 may provide a virtual representation of such a geolocation even when the unmanned aerial vehicle 102 is unable to physically traverse the restricted area. It should be noted that the display 120 may be integrally formed with the controller 101 and/or may include one or more remote devices, such as a wireless head-mounted display.

When the monitoring device 114 detects that the unmanned aerial vehicle 102 is within a predetermined distance from a restricted boundary, the monitoring device 114 may disable movement mechanisms 106 from traversing the restricted boundary. For example, the monitoring device 114 may disable any propulsion mechanisms such that the unmanned aerial vehicle 102 may not function and/or aerially navigate beyond a certain range from the restricted boundary. The route generator 118 may generate one or more alternative navigation methods, such a virtual representation of the restricted area. Thus, the route generator 118 provides the user with an alternative method to view and/or interact with the restricted area without physically traversing the restricted area via the unmanned aerial vehicle 102. Accordingly, the unmanned aerial vehicle 102 may be "stopped" at the restricted boundary and the user may virtually navigate within the restricted boundary, if permitted. While the user is virtually navigating within the restricted area, the unmanned aerial vehicle 102 may hover at the restricted boundary and/or land to save energy and/or recharge. It should be noted that such virtual representation may be approved/provided by the landowner/property owner, which may be stored in route generator 118.

In some embodiments, the user, or an automated system, may select the one or more visual representations of a geolocation based on the user's cognitive state (e.g., the user inputs into the drone 102 "I'm tired, and want to be excited," and then the drone 102 may generate a fast and/or realistic representation, rather than a slow and abstract representation), user's demographics (e.g., a young user may enjoy a cartoonlike representation whereas an older user may enjoy seeing a view of the area as if from the early 1900's), interests, hobbies, etc. Some of this information may be specified in a user profile stored in a database. In some embodiments, such information may be spoken or typed as input into the unmanned aerial vehicle 102 in real-time using GUI 112. Some of the information may be gleaned from a user's behavior, such as being distracted as he or she removes a head-mounted display or gazes away from the controller 101, or performs in a jittery or calm manner using drone controllers. In some embodiments, the user may select only views and/or virtual representations of particular objects, such as flowers, buildings, etc. In some embodiments, a user may select representations showing architectural evolution of particular geolocations and the route generator 118 may generate and display, via display 120, selected imagery of architectural evolution associated with the particular geolocation, if available. In some embodiments, the route generator 118 may generate one or more still images and/or videos featuring the restricted area taken at another time (e.g., outdated imagery, stored imagery, etc.).

In an embodiment, an alternative navigation method may include physically traversing/navigating the restricted area via a secondary unmanned aerial vehicle 202. For example, the landowner and/or property owner may authorize use of a secondary unmanned aerial vehicle 202, which may be provided by the landowner and/or property owner. When the unmanned aerial vehicle 102 physically comes within a predetermined distance from the restricted boundary, the route generator 118 may "stop" the unmanned aerial vehicle 102 at the boundary and provide the user with a secondary unmanned aerial vehicle 202. For example, the unmanned aerial vehicle 102 may be "swapped out" with the secondary unmanned aerial vehicle 202 temporarily. Accordingly, the user may communicate with the secondary unmanned aerial vehicle 202 via transceiver 122 to perform one or more functions via the secondary unmanned aerial vehicle 202. The transceiver 122 may be configured to communicate with the secondary unmanned aerial vehicle 202 such that the user may control one or more functions/components of the secondary unmanned aerial vehicle 202.

The secondary unmanned aerial vehicle 202 may include the same and/or similar components as the unmanned aerial vehicle 102, such as a camera 208 and/or GPS 210. The camera 208 may, for example, provide still images and/or video feedback within the restricted area to the user, which may be displayed on display 120. In some embodiments, the secondary unmanned aerial vehicle 202 may have limited functionality, as determined by the landowner/property owner. For example, the camera 208 may have limited resolution (e.g., lower resolution) compared to the unmanned aerial vehicle 102 and/or may be limited in zooming functionalities. The secondary unmanned aerial vehicle 202 may fly more quietly, may be electric powered to avoid pollution within the restricted area, prevent recording of images and/or videos, etc. Thus, the users retain the ability to explore and/or navigate the real environment of the restricted area, however such navigation may be limited as permitted by the landowner.

In some embodiments, the secondary unmanned aerial vehicle 202 may be configured such that portions of the restricted area remain inaccessible to the user via secondary unmanned aerial vehicle 202. However, it should be noted that the route generator 118 may generate a virtual representation of the restricted portion, if permitted by the landowner. Accordingly, the route generator 118 may provide a plurality of methods in combination with each other for the user to navigate beyond the restricted boundary.

It should be understood that while the controller 101 is shown as a remote device, components of the controller 101 may be implemented on the unmanned aerial vehicle 102. For example, the unmanned aerial vehicle 102 may include the monitoring device 114, the authentication device 116, the route generator 118, and/or the transceiver 122. In some embodiments, the unmanned aerial vehicle 102 could autonomously perform the one or more functions of the monitoring device 114, the authentication device 116, the route generator 118, and/or the transceiver 122 to provide a user with alternative methods for navigating beyond a restricted boundary (e.g., within a restricted area/environment).

Figure 2:
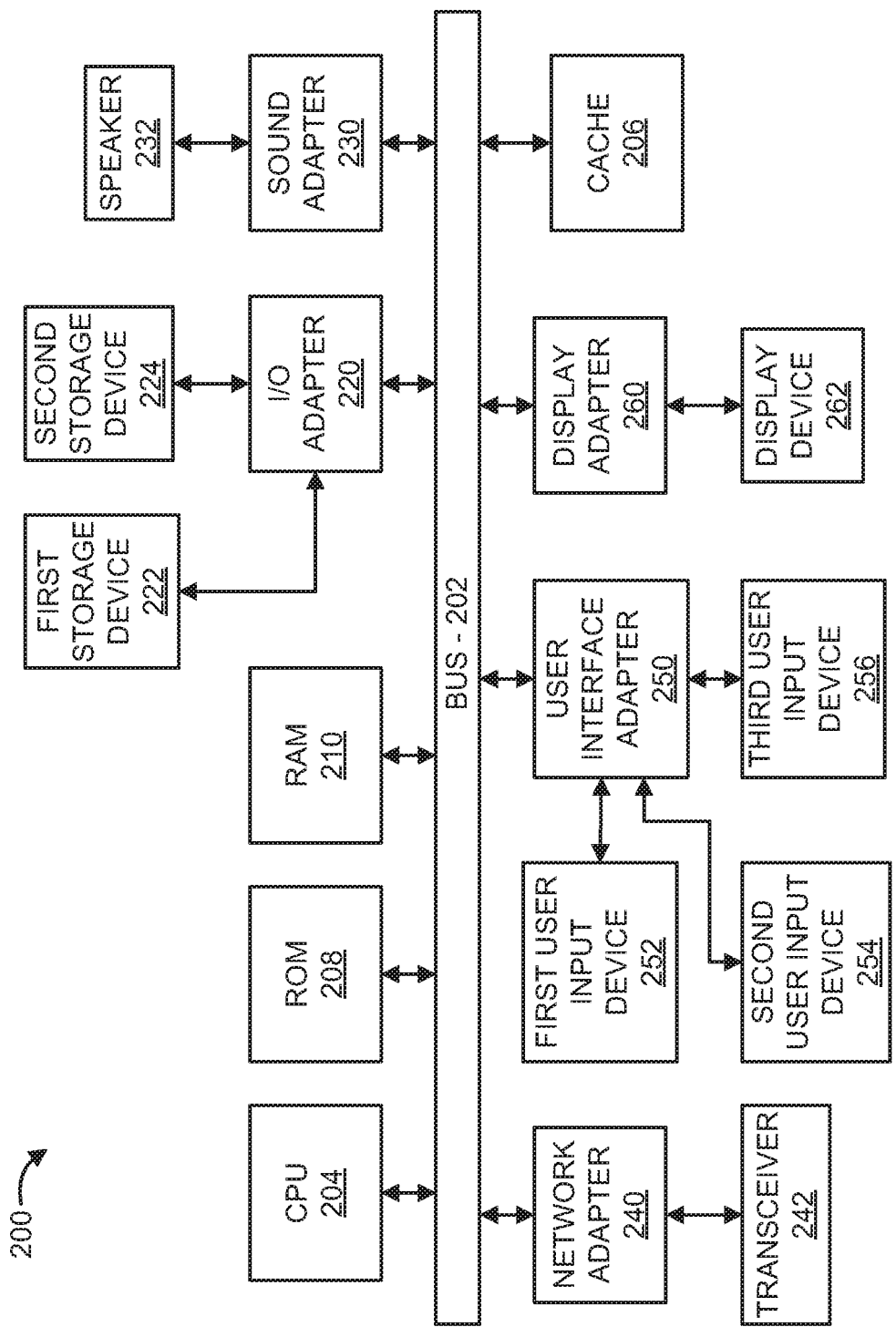
FIG. 2 shows an exemplary processing system for continued navigation of unmanned aerial vehicles beyond restricted airspace boundaries, in accordance with an embodiment of the present principles.

It is to be appreciated that system 200 described below with respect to FIG. 2 is a system for implementing respective embodiments of the present principles. Part or all of processing system 100 may be implemented in one or more of the elements of system 200 of FIG. 2. Further, it is to be appreciated that processing system 100 and/or 200 may perform at least part of the method described herein, including, for example, at least part of method 300 of FIG. 3.

Now referring to FIG. 2, with continued reference to FIG. 1, an exemplary processing system 200 to which the present principles may be applied, in accordance with an embodiment, is illustratively depicted. The processing system 200 includes at least one processor, such as a computer processing unit (CPU) 204, operatively coupled to other components via a system bus 202. A cache 206, a Read Only Memory (ROM) 208, a Random Access Memory (RAM) 210, an input/output (I/O) adapter 220, a sound adapter 230, a network adapter 240, a user interface adapter 250, and a display adapter 260 are operatively coupled to the system bus 202.

A first storage device 222 and a second storage device 224 are operatively coupled to system bus 202 by the I/O adapter 220. The storage devices 222 and 224 can be any of a disk storage device (e.g., a magnetic or optical disk storage device), a solid state magnetic device, etc. The storage devices 222 and 224 can be the same type of storage device or different types of storage devices. In one embodiment, database images of geolocations (e.g., satellite images) may be stored on the first storage device 222 and/or the second storage device 224 for comparison with images obtained by the camera 108 of FIG. 1. In some embodiments, geolocation data corresponding to restricted areas may be stored on the first storage device 222 and/or the second storage device 224.

A speaker 232 is operatively coupled to system bus 202 by the sound adapter 230. A transceiver 242 is operatively coupled to system bus 202 by network adapter 240. A display device 262 is operatively coupled to system bus 202 by display adapter 260. In an embodiment, the display device 262 may be configured to display geolocation information associated with the unmanned aerial vehicle 102, restricted areas and/or restricted boundaries provided by the transceiver 242. In some embodiments, the display device 262 may display, to a user, a virtual map and/or virtual representation of at least one restricted area. In some embodiments, the virtual map displayed on the display device 262 may be used to track/monitor the unmanned aerial vehicle 102 within the restricted area.

A first user input device 252, a second user input device 254, and a third user input device 256 are operatively coupled to system bus 202 by user interface adapter 250. The user input devices 252, 254, and 256 can be any type of input device, including but not limited to, a keyboard, a mouse, a keypad, an image capture device, a motion sensing device, a microphone, a device incorporating the functionality of at least two of the preceding devices, and so forth. The user input devices 252, 254, and 256 can be the same type of user input device or different types of user input devices. The user input devices 252, 254, and 256 are used to input and output information to and from system 200.

The processing system 200 may also include other elements (not shown) or may omit some elements as shown. For example, various other input devices and/or output devices can be included in processing system 200 depending upon the particular implementation of the same, such as various types of wireless and/or wired input and/or output devices. Moreover, additional processors, controllers, memories and so forth, in various configurations, can also be utilized. These and other variations of the processing system 200 are readily contemplated.

Figure 3:
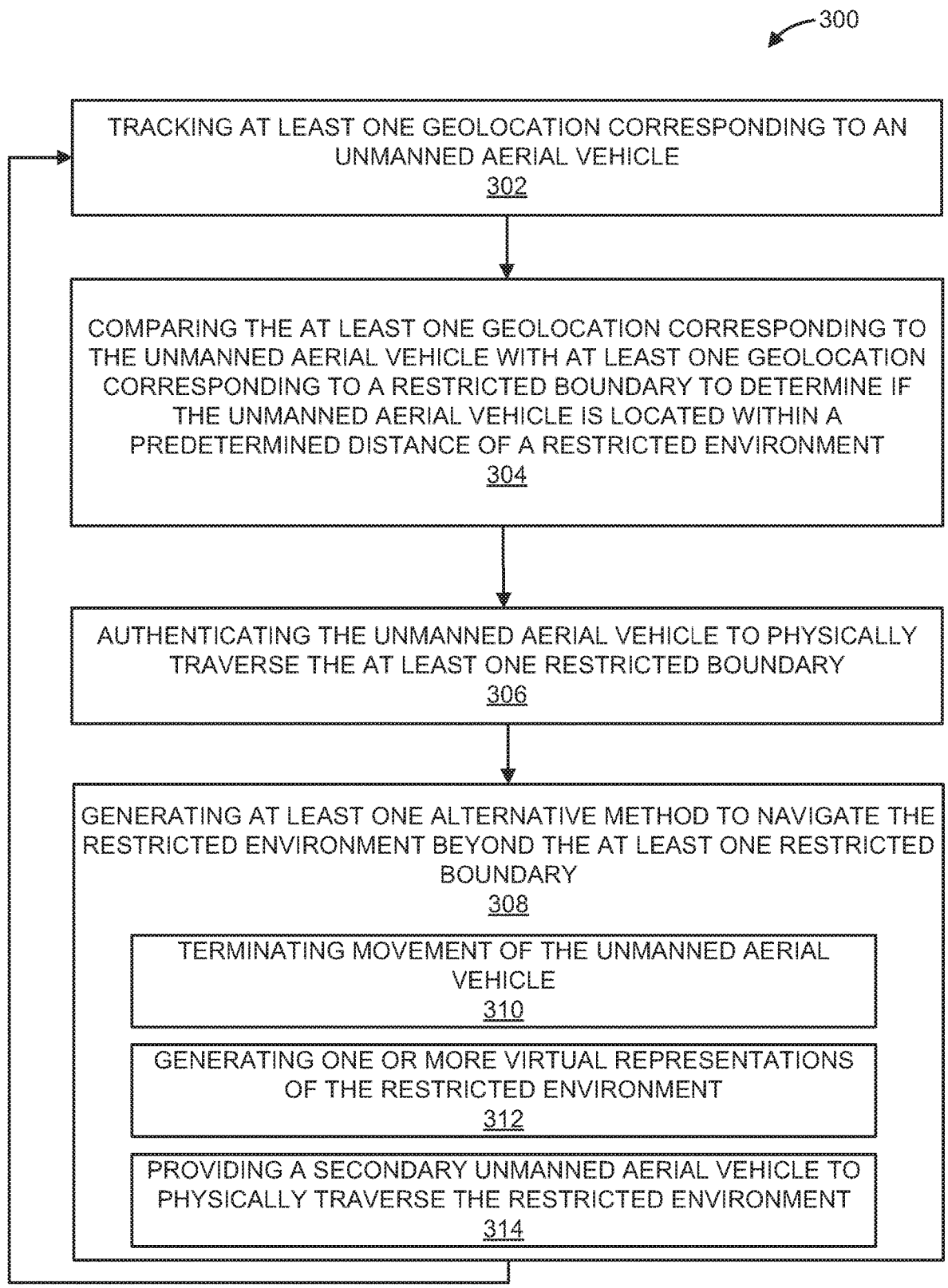
FIG. 3 shows an exemplary method for continued navigation of unmanned aerial vehicles beyond restricted airspace boundaries, in accordance with an embodiment of the present principles.

Referring now to FIG. 3, with continued reference to FIG. 1, FIG. 3 shows an exemplary method 300 for continued navigation of unmanned aerial vehicles beyond restricted airspace boundaries, in accordance with an embodiment of the present principles.

In block 302, the method 300 may include tracking, using a processor-based monitoring device (e.g., monitoring device 114 of FIG. 1), at least one geolocation corresponding to an unmanned aerial vehicle 102. In some embodiments, tracking the at least one geolocation corresponding to the unmanned aerial vehicle 102 may include monitoring navigation coordinates generated by a global positioning system (GPS).

In block 304, the method 300 may include comparing the at least one geolocation corresponding to the unmanned aerial vehicle 102 with at least one geolocation corresponding to a restricted boundary to determine a location of the unmanned aerial vehicle 102 with respect to a restricted environment.

In an embodiment, the method 300 may include authenticating the unmanned aerial vehicle 102 to physically traverse the at least one restricted boundary, as illustrated in block 306. For example, authenticating the unmanned aerial vehicle 102 may include initiating one or more authentication protocols. In some embodiments, authenticating the unmanned aerial vehicle 102 to physically traverse the restricted boundary may include disabling one or more functions of the unmanned aerial vehicle 102, such as camera 108 functions, upon authentication.

In block 308, the method 300 may include generating at least one alternative navigation method to navigate the restricted environment when the unmanned aerial vehicle 102 is located within a predetermined distance of the restricted environment. In some embodiments, generating the at least one alternative navigation method includes terminating movement of the unmanned aerial vehicle 102 such that the unmanned aerial vehicle 102 is prevented from physically traversing the at least one restricted boundary, as illustrated in block 310. In an embodiment, generating the at least one alternative navigation method may include generating a virtual map representing a geolocation beyond the at least one restricted boundary, as illustrated in block 312. The virtual map may be selected from a plurality of images and/or videos of satellite imagery, street maps, graphical representations of environments, limited real-time imagery, outdated imagery, etc. In an embodiment, generating the at least one alternative navigation method may include providing a secondary unmanned aerial vehicle 202 to physically traverse the at least one restricted boundary, as illustrated in block 314. It should be noted that blocks of 302-314 may be continuously repeated.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 4:
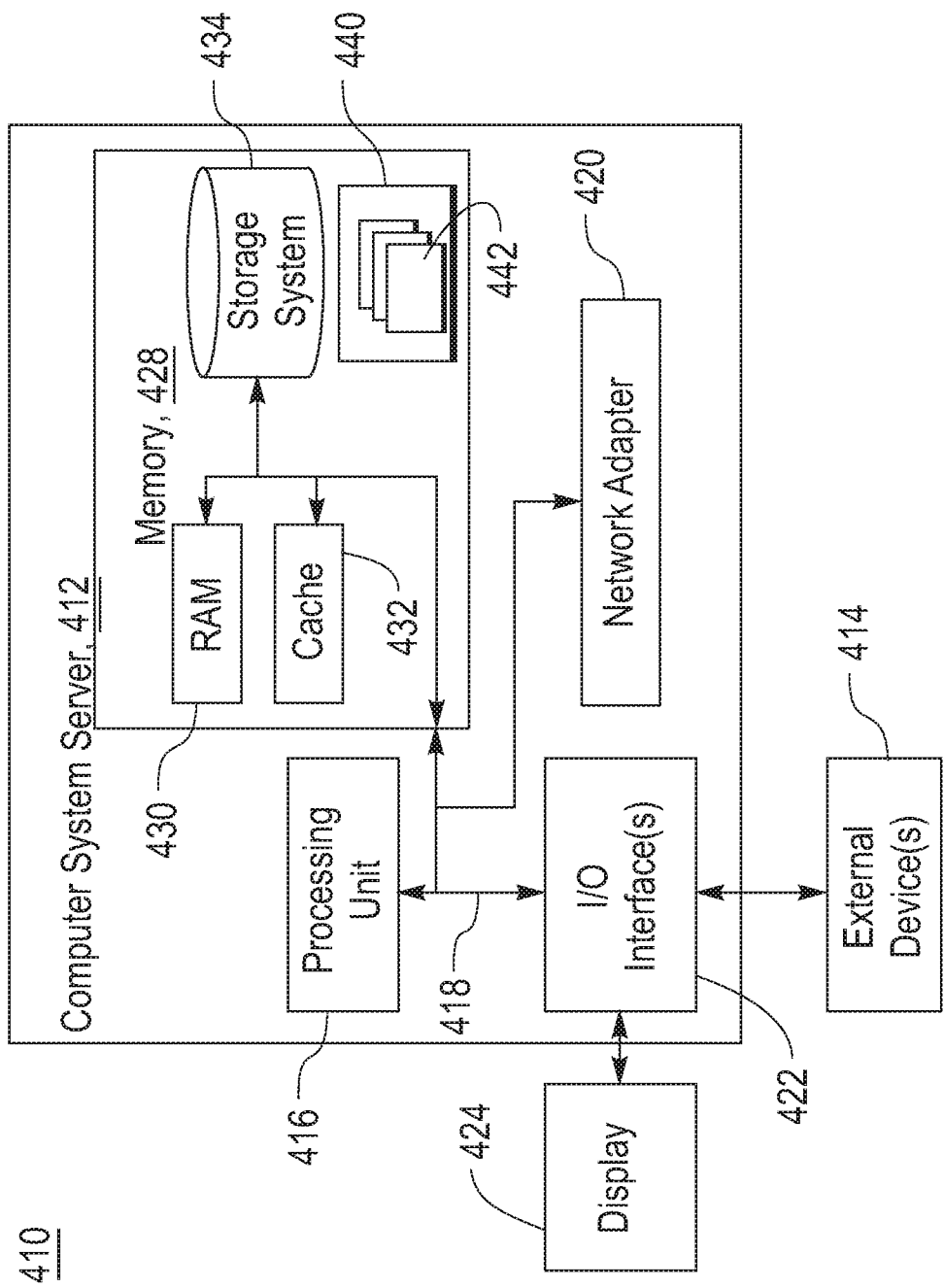
FIG. 4 shows an exemplary cloud computing node, in accordance with an embodiment of the present principles.

Referring now to FIG. 4, a schematic of an example of a cloud computing node 410 is shown. Cloud computing node 410 is only one example of a suitable cloud computing node and is not intended to suggest any limitation as to the scope of use or functionality of embodiments of the invention described herein. Regardless, cloud computing node 410 is capable of being implemented and/or performing any of the functionality set forth hereinabove.

In cloud computing node 410 there is a computer system/server 412, which is operational with numerous other general purpose or special purpose computing system environments or configurations. Examples of well-known computing systems, environments, and/or configurations that may be suitable for use with computer system/server 412 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 412 may be described in the general context of computer system executable instructions, such as program modules, being executed by a computer system. Generally, program modules may include routines, programs, objects, components, logic, data structures, and so on that perform particular tasks or implement particular abstract data types. Computer system/server 412 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 4, computer system/server 412 in cloud computing node 410 is shown in the form of a general-purpose computing device. The components of computer system/server 412 may include, but are not limited to, one or more processors or processing units 416, a system memory 428, and a bus 418 that couples various system components including system memory 428 to processor 416.

Bus 418 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 412 typically includes a variety of computer system readable media. Such media may be any available media that is accessible by computer system/server 412, and it includes both volatile and non-volatile media, removable and non-removable media.

System memory 428 can include computer system readable media in the form of volatile memory, such as random access memory (RAM) 430 and/or cache memory 432. Computer system/server 412 may further include other removable/non-removable, volatile/non-volatile computer system storage media. By way of example only, storage system 434 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 418 by one or more data media interfaces. As will be further depicted and described below, memory 428 may include at least one program product having a set (e.g., at least one) of program modules that are configured to carry out the functions of embodiments of the invention.

Program/utility 440, having a set (at least one) of program modules 442, may be stored in memory 428 by way of example, and not limitation, as well as an operating system, one or more application programs, other program modules, and program data. Each of the operating system, one or more application programs, other program modules, and program data or some combination thereof, may include an implementation of a networking environment. Program modules 442 generally carry out the functions and/or methodologies of embodiments of the invention as described herein.

Computer system/server 412 may also communicate with one or more external devices 414 such as a keyboard, a pointing device, a display 424, etc.; one or more devices that enable a user to interact with computer system/server 412; and/or any devices (e.g., network card, modem, etc.) that enable computer system/server 412 to communicate with one or more other computing devices. Such communication can occur via Input/Output (I/O) interfaces 422. Still yet, computer system/server 412 can communicate with one or more networks such as a local area network (LAN), a general wide area network (WAN), and/or a public network (e.g., the Internet) via network adapter 420. As depicted, network adapter 420 communicates with the other components of computer system/server 412 via bus 418. It should be understood that although not shown, other hardware and/or software components could be used in conjunction with computer system/server 412. Examples, include, but are not limited to: microcode, device drivers, redundant processing units, external disk drive arrays, RAID systems, tape drives, and data archival storage systems, etc.

Figure 5:
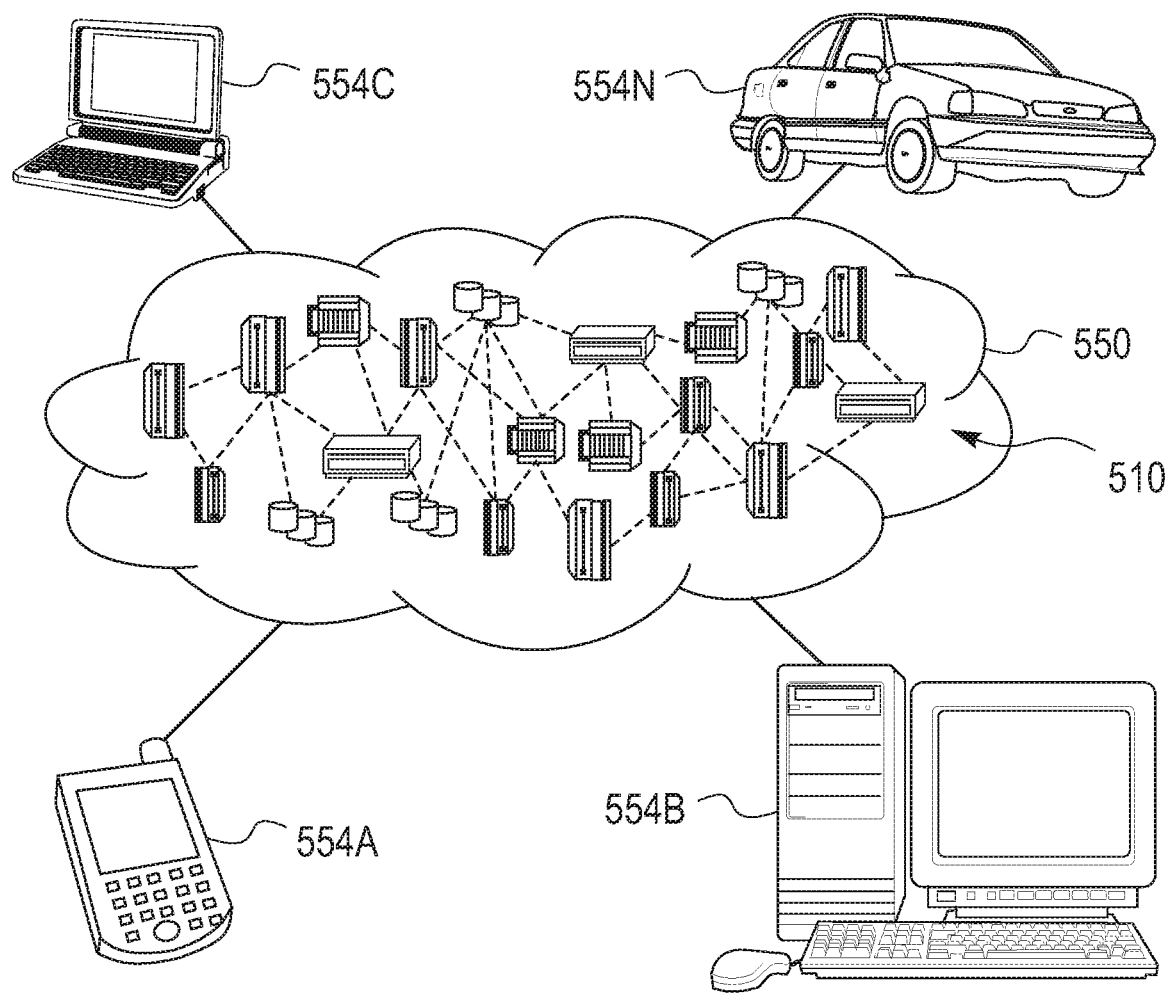
FIG. 5 shows an exemplary cloud computing environment, in accordance with an embodiment of the present principles.

Referring now to FIG. 5, illustrative cloud computing environment 550 is depicted. As shown, cloud computing environment 550 includes one or more cloud computing nodes 510 with which local computing devices used by cloud consumers, such as, for example, personal digital assistant (PDA) or cellular telephone 554A, desktop computer 554B, laptop computer 554C, and/or automobile computer system 554N may communicate. Nodes 510 may communicate with one another. They may be grouped (not shown) physically or virtually, in one or more networks, such as Private, Community, Public, or Hybrid clouds as described hereinabove, or a combination thereof. This allows cloud computing environment 550 to offer infrastructure, platforms and/or software as services for which a cloud consumer does not need to maintain resources on a local computing device. It is understood that the types of computing devices 554A-N shown in FIG. 5 are intended to be illustrative only and that computing nodes 510 and cloud computing environment 550 can communicate with any type of computerized device over any type of network and/or network addressable connection (e.g., using a web browser).

Figure 6:
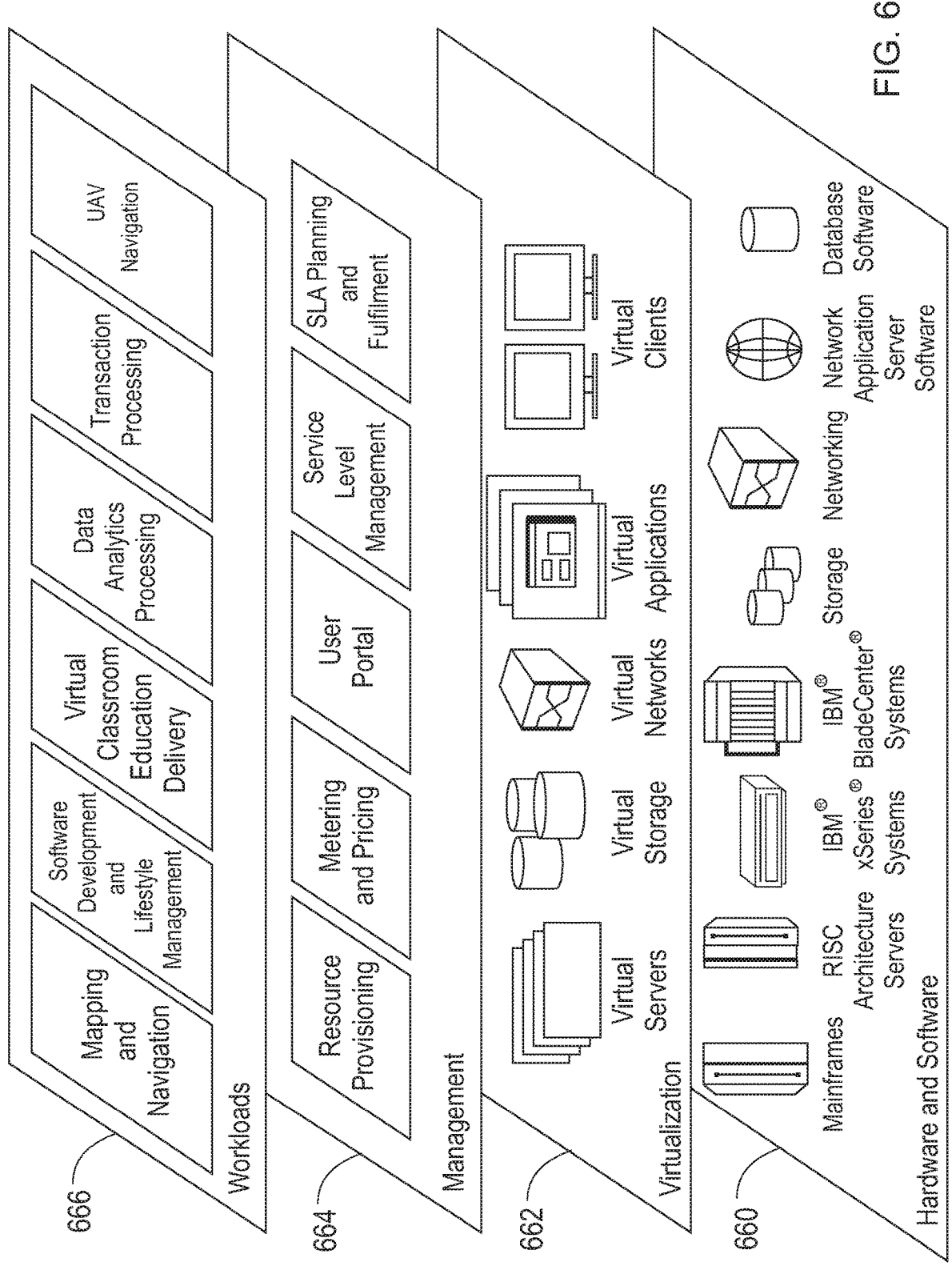
FIG. 6 shows exemplary abstraction model layers, in accordance with an embodiment of the present principles.

Referring now to FIG. 6, a set of functional abstraction layers provided by cloud computing environment 550 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 660 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 662 provides an abstraction layer from which the following examples of virtual entities may be provided: virtual servers; virtual storage; virtual networks, including virtual private networks; virtual applications and operating systems; and virtual clients.

In one example, management layer 664 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 666 provides examples of functionality for which the cloud computing environment may be utilized. Examples of workloads and functions which may be provided from this layer include: mapping and navigation; software development and lifecycle management; virtual classroom education delivery; data analytics processing; transaction processing; and unmanned aerial vehicle (UAV) navigation, in accordance with the present invention.

Having described preferred embodiments of an unmanned aerial vehicle for continued navigation of unmanned aerial vehicles beyond restricted boundaries, which are intended to be illustrative and not limiting, it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

The invention claimed is:

1. A system for navigation of unmanned aerial vehicles around restricted boundaries, the system comprising:
  a monitoring device to track a geolocation corresponding to an unmanned aerial vehicle relative to a restricted boundary of a restricted environment;
  a route generator to generate at least one alternative navigation method to navigate when the unmanned aerial vehicle is located within or a predetermined distance from the restricted environment; and
  an authentication device configured to disable one or more functions of the unmanned aerial vehicle upon authentication.

2. The system of claim 1, wherein the authentication device is further configured to authenticate the unmanned aerial vehicle to physically traverse the restricted boundary.

3. The system of claim 1, wherein the route generator is further configured to terminate movement of the unmanned aerial vehicle relative to the restricted boundary.

4. The system of claim 1, wherein the at least one alternative navigation method includes a virtual representation corresponding to a geolocation beyond the restricted boundary such that the virtual representation provides continued virtual navigation beyond the restricted boundary.

5. The system of claim 4, wherein the virtual representation is selected from the group consisting of satellite imagery, street maps, graphical representations of environments, limited real-time imagery, and stored imagery.

6. The system of claim 1, wherein the at least one alternative navigation method includes a secondary unmanned aerial vehicle to physically navigate at least a portion of the restricted environment.

7. The system of claim 1, wherein the restricted environment includes at least one environment selected from the group consisting of no-fly zones, military bases, airports, hospitals, wildlife sanctuaries, and private property.

8. A method for navigation of unmanned aerial vehicles around restricted boundaries, the method comprising:
  comparing a geolocation corresponding to an unmanned aerial vehicle with at least one geolocation corresponding to a restricted boundary to determine a location of the unmanned aerial vehicle with respect to a restricted environment;
  generating at least one alternative navigation method to navigate when the unmanned aerial vehicle is located within or a predetermined distance from the restricted environment; and
  disabling one or more functions of the unmanned aerial vehicle upon authentication using an authentication device.

9. The method of claim 8, wherein the authentication further comprises authenticating the unmanned aerial vehicle to physically traverse the restricted boundary.

10. The method of claim 8, wherein generating the at least one alternative method includes terminating movement of the unmanned aerial vehicle such that the unmanned aerial vehicle is prevented from physically traversing the restricted boundary.

11. The method of claim 8, wherein generating the at least one alternative method includes generating a virtual representation corresponding to a geolocation beyond the restricted boundary such that the virtual representation provides continued virtual navigation of at least a portion of the restricted environment.

12. The method of claim 11, wherein the virtual representation is selected from the group consisting of satellite imagery, street maps, graphical representations of environments, limited real-time imagery, and stored imagery.

13. The method of claim 8, wherein generating the at least one alternative method includes providing a secondary unmanned aerial vehicle to physically navigate at least a portion of the restricted environment.

14. A non-transitory computer readable storage medium comprising a computer readable program for continued navigation of unmanned aerial vehicles around restricted boundaries, wherein the computer readable program, when executed on a computer, causes the computer to execute:
  comparing a geolocation corresponding to an unmanned aerial vehicle with at least one geolocation corresponding to a restricted boundary to determine a location of the unmanned aerial vehicle with respect to a restricted environment;
  generating at least one alternative navigation method to navigate when the unmanned aerial vehicle is located within or a predetermined distance from the restricted environment; and
  disabling one or more functions of the unmanned aerial vehicle upon authentication using an authentication device.

15. The non-transitory computer readable storage medium of claim 14, further comprising authenticating the unmanned aerial vehicle to physically traverse the restricted boundary.

16. The non-transitory computer readable storage medium of claim 14, wherein generating the at least one alternative navigation method includes terminating movement of the unmanned aerial vehicle such that the unmanned aerial vehicle is prevented from physically traversing the restricted boundary.

17. The non-transitory computer readable storage medium of claim 14, wherein generating the at least one alternative navigation method includes generating a virtual representation corresponding to a geolocation beyond the restricted boundary such that the virtual representation provides continued virtual navigation of at least a portion of the restricted environment.

18. The non-transitory computer readable storage medium of claim 14, wherein generating the at least one alternative navigation method includes providing a secondary unmanned aerial vehicle to physically navigate at least a portion of the at least one restricted environment.

* * * * *